US006684805B2

(12) United States Patent
Curchod

(10) Patent No.: US 6,684,805 B2
(45) Date of Patent: Feb. 3, 2004

(54) ROPE LOOP CONNECTION SYSTEM FOR YACHTS

(76) Inventor: Donald B. Curchod, 273 Whale Beach Road, Whale Beach, NSW (AU), 2107

( * ) Notice: Subject to any disclaimer, the term of this patent is extended or adjusted under 35 U.S.C. 154(b) by 0 days.

(21) Appl. No.: 10/149,367

(22) PCT Filed: Dec. 11, 2000

(86) PCT No.: PCT/US00/33646
§ 371 (c)(1),
(2), (4) Date: Jun. 6, 2002

(87) PCT Pub. No.: WO01/42682
PCT Pub. Date: Jun. 14, 2001

(65) Prior Publication Data
US 2003/0000442 A1 Jan. 2, 2003

(51) Int. Cl.$^7$ ................................. B63B 21/04
(52) U.S. Cl. ................ 114/218; 114/108; 114/230.2; 254/405; 254/415
(58) Field of Search ................. 114/108, 218, 114/230.2, 230.26; 254/401, 402, 405, 416, 413, 414, 415, 390; 294/74; 403/209, 267, 268; 87/1, 6, 8; 242/404.1, 598.5

(56) References Cited

U.S. PATENT DOCUMENTS

| 790,929 | A | * | 5/1905 | Smith ........................... 294/74 |
| 2,103,630 | A | * | 12/1937 | Morin .......................... 114/218 |
| 2,533,905 | A | * | 12/1950 | Aconley ....................... 294/74 |
| 2,872,716 | A | * | 2/1959 | Ehmann et al. ............... 294/74 |
| 3,058,184 | A | * | 10/1962 | Ritzheimer ................... 294/74 |
| 3,094,755 | A | * | 6/1963 | Casanave ................. 114/230.2 |
| 3,507,949 | A | * | 4/1970 | Campbell .................... 403/267 |
| 3,512,223 | A | * | 5/1970 | Willinger .................... 403/209 |
| 4,109,603 | A | * | 8/1978 | Guthmann ............. 114/230.29 |
| 4,121,325 | A | * | 10/1978 | Bruinette et al. ........... 403/209 |
| 4,145,029 | A | * | 3/1979 | Johns .......................... 254/390 |
| 4,332,372 | A | * | 6/1982 | Singer ......................... 254/391 |
| 4,661,077 | A | * | 4/1987 | Griffith et al. ........... 114/230.2 |
| 4,912,816 | A | * | 4/1990 | Brandt ..................... 114/230.2 |
| 4,930,193 | A | * | 6/1990 | Baker ........................ 24/129 R |
| 5,018,775 | A | * | 5/1991 | McKenna et al. ............. 294/74 |
| 5,027,497 | A | * | 7/1991 | Takaki et al. ................ 403/267 |
| 5,154,401 | A | * | 10/1992 | Schramm et al. ........... 254/416 |
| 5,207,171 | A | * | 5/1993 | Westwood, III ............. 114/218 |
| 5,525,003 | A | * | 6/1996 | Williams et al. ............ 403/267 |
| 5,611,636 | A | * | 3/1997 | Flory .......................... 403/268 |
| 5,613,457 | A | * | 3/1997 | Frank et al. ................. 114/218 |
| 5,660,133 | A | * | 8/1997 | Munich ....................... 114/219 |
| 6,094,783 | A | * | 8/2000 | Parsons ....................... 114/218 |
| 6,460,799 | B1 | * | 10/2002 | Ryan ........................ 242/594.5 |

FOREIGN PATENT DOCUMENTS

| EP | 0655412 A1 | * | 10/1994 |
| FR | 1227410 | * | 3/1959 |
| FR | 1526006 | * | 2/1967 |

* cited by examiner

Primary Examiner—S. Joseph Morano
Assistant Examiner—Lars A. Olson
(74) Attorney, Agent, or Firm—Patrick T. King

(57) ABSTRACT

A connection system for Yachts comprising a lightweight rope loop (2) and a body part for connecting sheets, sails and blocks. A tensile connecting device comprises a high strength fiber rope with a first enlarged terminated end that is held captive in a second body part having a shoulder (59a) such that said elongated loop is slipped over said shoulder to form a quickly connected and disconnected tensile joining device.

10 Claims, 8 Drawing Sheets

ROPE LOOP CONNECTION SYSTEM FOR YACHTS

BACKGROUND OF THE INVENTION

1. Field of the Invention

This invention relates to a simple, lightweight, connection system for the connection of halyards and sheets to sails, ropes, and pulleys, and other items in a yacht using a high strength, elongate rope loop in place of stainless steel cables.

2. Prior Art

Historically, halyards, sheets, ropes, pulleys, sails and other parts were connected using various types of stainless steel shackles, swivels, and connectors, which are relatively complicated to manufacture and are modern yachts now generally employ much lighter construction methods than were extremely heavy, due to the inherent density of the stainless steel metal. The performance of a yacht, especially while sailing, is extremely dependent on weight. Since used historically, a need exists for a lighter, simpler method of making the myriad connections used on a yacht. This need for lighter weight components is extremely important in sailing, especially on masts, fore, aft, and on the lee side for connecting sheets, halyards, pulleys, etc, where weight causes additional detrimental displacement when the yacht is heeled and "hobbyhorsing", which results in a corresponding loss of performance. These detrimental effects can be significantly reduced by a corresponding reduction in the weight of connection fittings.

High tensile-strength braided ropes, including so-called super braids made of KEVLAR, SPECTRA, and other similar materials are replacing older ropes and stainless steel wire in high load applications on yachts in order to reduce weight. The present invention utilizes such high tensile braids in the form of a elongate loop which takes the majority of the tensile forces and can be combined with minimal weight connector bodies capable of being made with aluminum or plastic, in order to make the various connections on a yacht which are otherwise made with stainless steel.

SUMMARY OF THE INVENTION

An object of the present invention is to provide lightweight devices for connecting various items in tension where the invention uses a high tensile-strength braided rope with its ends joined to form an elongated rope loop that replaces metal connectors.

Another object of the invention is to provide lightweight devices for connecting various items in tension where the two ends provide an end joint that is substantially larger in cross-sectional area than the cross section of the braided ropes.

Another object of the invention is to provide a method of manufacture of an elongate loop connection device made from a lightweight high strength fiber rope with it's ends rigidly joined to form a elongate loop with the joint being of substantially larger cross-sectional area than that of the two rope cross sections that are so joined.

Another object of the invention is to provide a lightweight tensile connection device, which utilizes a high strength fiber elongate rope loop which is held captive in a rigid body to form a connection fitting.

Another object of the invention is to provide a device which utilizes a high strength fiber elongate loop with an enlarged end joint which end joint is held captive in a rigid fitting where the elongate loop free end fits over a shoulder on the fitting to form a lightweight tension connector, and where this elongate looped rope is designed to take substantially all the tensile forces in the connector.

Another object of the invention is to provide a lightweight shackle where a high strength elongate looped rope is the primary carrier of the load having one end captive and the other end passing over a shoulder on a connector body. The elongate loop is designed to be self-locking, easily fitted, and removed.

A further object of the invention is to provide a lightweight block where a high strength elongate looped rope is the primary carrier of the connection load having one end captive and the other end passing over a shoulder on the body. A sheave rotates around the body and the elongate loop is designed to form an easily fitted, and removed, lightweight block connection.

A further object of the invention is to provide a lightweight swivel shackle where a high strength elongate looped rope is the primary carrier of a first connection load having one end captive in and the other end passing over a shoulder on a rigid body. The body has a central hole for the second connection around which the fitting is able to rotate. The elongate loop is designed to be locking, easily fitted, and removed.

The inveniton provides a lightweight connection system for yachts, a tensile connecting device comprising an elongated rope loop formed from a rope having multiple fibers and having its free ends joined together to form a joint such that the joint is of substantially larger diameter than that of said multiple-fiber rope. Said multiple fibers are separated for at least two times their diameter and infused with an adhesive to form at least one rigid potted joint, said potted joint forming at least one head substantially larger than the diameter of the multiple-fiber rope.

A method of forming an elongated rope loop for use with a second part as a lightweight connection device, comprises the steps of: separating the fibers at each end of a multiple-fiber rope for a length of at least twice the diameter of the rope; placing the ends of the multiple-fiber rope in a mold; wetting the said separated fibers with an adhesive material; and compressing the separated wetted fibers in the mold to form at least one enlarged head of substantially larger cross sectional area than that of the rope.

A tensile connecting device comprises a high strength fiber rope with a first enlarged terminated end that is held captive in a second body part to form an elongated rope loop; where said second body part having a shoulder such that said elongated loop is slipped over said shoulder to form a quickly connected and disconnected tensile joining, device.

DETAILED DESCRIPTION OF The PREFERRED EMBODIMENTS OF THE INVENTION

Figure 1:
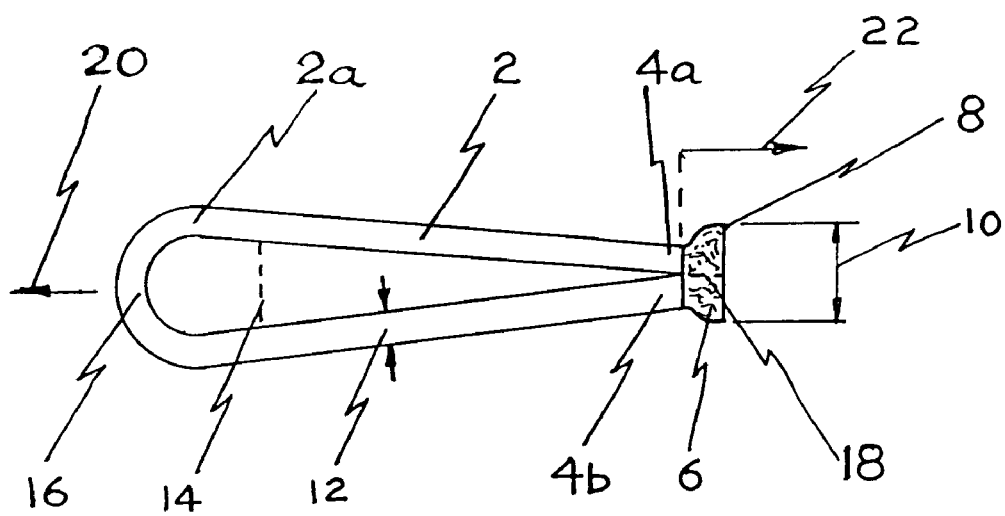
FIG. 1 shows a plan view of an elongate rope loop with an enlarged end connection joint.

FIG. 1 shows a typical elongated rope loop 2, according to the present invention, formed from a length of high tensile-strength braided rope that has its free ends 4a, 4b brought together with the end fibers shown compacted. The end fibers at the free ends 4a, 4b are spread apart, glued, and compacted to form a rigid potted joint that forms an enlarged head 8. The rope loop 2 has a diameter 12. Note that the head 8 has a diameter dimension 10 that is significantly larger than two rope diameters.

In FIG. 1, an optional tie 14 generically designates various means for connecting together the sides of the rope loop 2 that have the respective free ends 4a, 4b near a top portion 16 of the elongated rope loop 2.

The invention uses a head 8 that can be formed as a single unit or formed in several sections, such as two halves, to achieve the same effect as a single unit.

The elongate rope loop 2 of FIG. 1 becomes a lightweight tension device which can support tension loads in a longitudinal direction 20, if the enlarged head 8 is restrained along the line 22.

Figure 2:
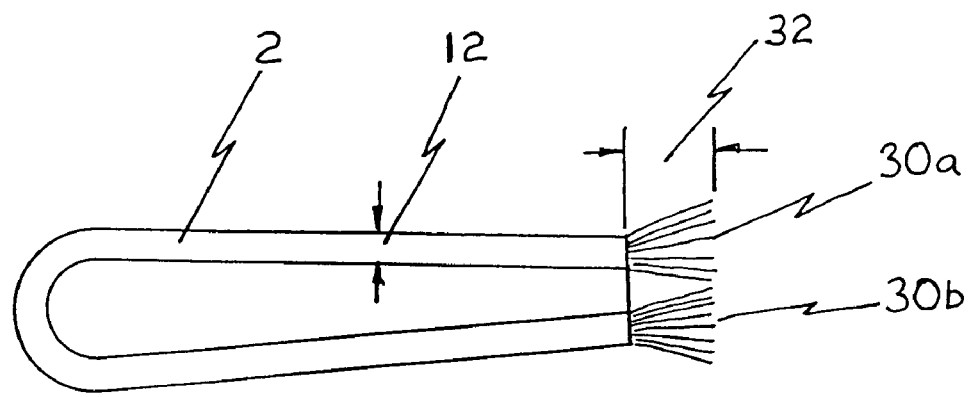
FIG. 2 shows a plan view of an elongate rope loop with the end fibers separated ready for potting.

FIG. 2 shows an elongated rope loop 2 provided from a cut portion of high tensile-strength braided rope. Free end fibers 30a, 30b of respective the respective free ends are cut to a length 32, un-raveled, and spread, as illustrated. The length 32 of the free end fibers 30a, is greater than twice the diameter 12 of the rope loop 2. The free end fibers 30a, 30b are coated with an adhesive and then compacted by molding to form the rigid potted head 8, or sections of the head 8 of FIG. 1.

Figures 3, 3A:
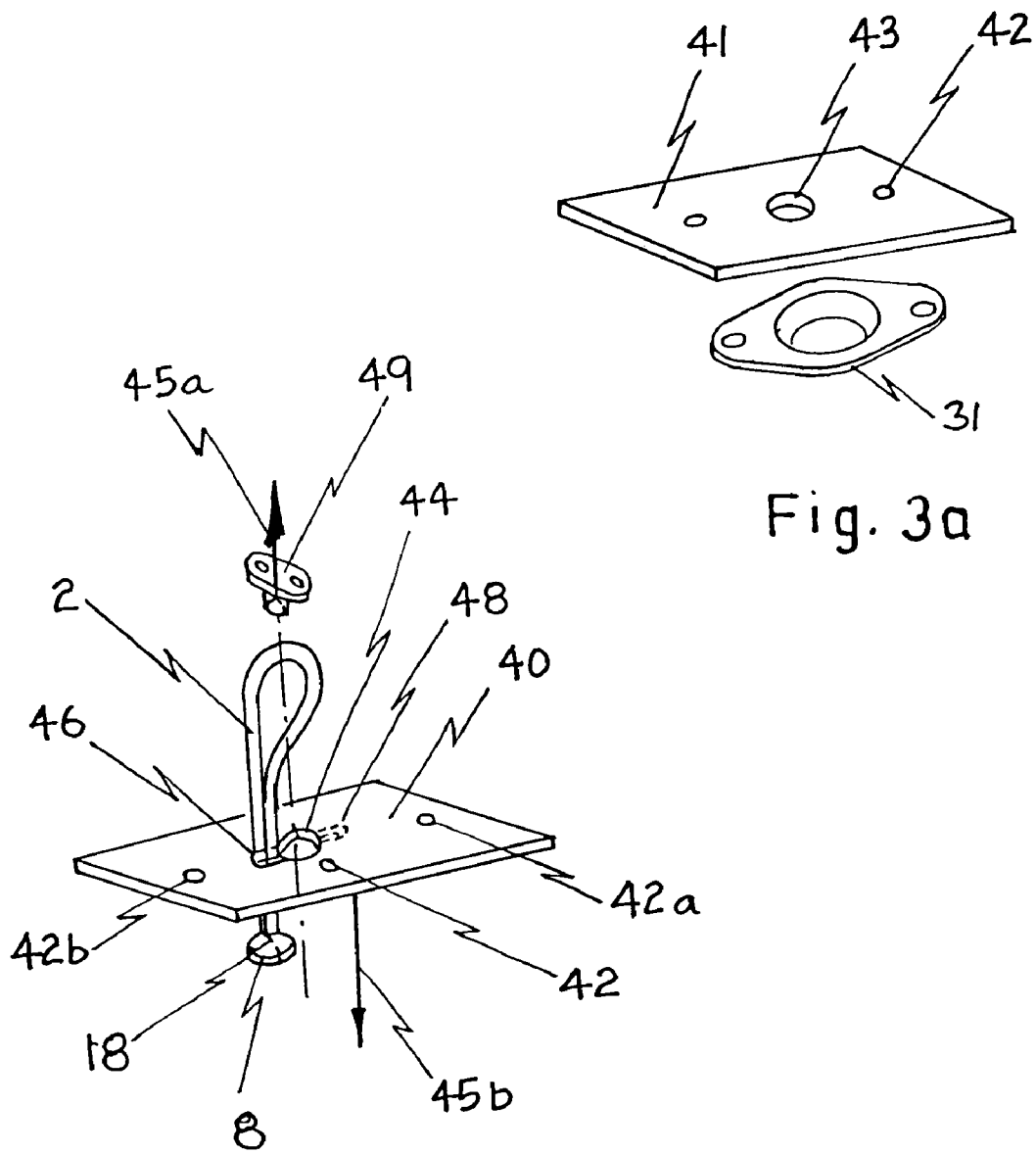
FIG. 3 shows an isometric view of a connection device employing an elongate rope loop and a mounting plate with lock.
FIG. 3A shows an isometric view of an alternative connection device to that of FIG. 3, employing an elongate rope loop and a mounting plate.

FIG. 3 shows the elongated rope loop 2 of FIG. 1 being applied to, for example, a deck fitting, such as the plate 40 that is anchored to a deck with fasteners such as screws or bolts (not shown) that extend through location holes 42a, 42b in the plate 40. The plate 40 has a central hole 44, which has a diameter slightly larger than the enlarged head 8 and through which the enlarged head 8 is passed from above. The central hole 44 has a smaller adjoining side slot 46. The elongated rope loop 2 with its enlarged head 8 is held captive in the plate 40 in the smaller adjoining side slot 46. The elongated rope loop 2 engages the side slot such that elongated rope loop 2 forms a connection device that is loaded in tension in a direction shown by arrows 45a and 45b. The plate 40 is primarily designed to fit below a deck or other surface but may also be fitted above a surface.

A plug 49 is fitted into the central hole 44 and held in place using appropriate fasteners, such as screws or bolts that extend into an attachment screw hole 42b. The plug 49 maintains the elongated rope loop 2 in the slot 46. This forms a lightweight tensile connection fitting in which the elongated rope loop 2 can be fitted or replaced from above the connection surface. It should be noted that the plate 40 is designed to provide a lightweight elongated rope loop connection.

An alternative construction provides a second smaller adjoining side slot 48 adjacent the central hole 44 and opposite the first smaller adjoining side slot 46. The second slot 48 is used if the elongated rope loop 2 is formed with two separated heads as described above. In that case the plug 49 would separate the two legs of the elongated rope loop 2.

FIG. 3A shows an alternative plate 41 to that of plate 40 of FIG. 3, with a smaller central hole 43 that is smaller than the enlarged head (or heads) 8. In this alternative arrangement, the elongated rope loop 2 is fitted from below. It should be noted that the plate 40 is designed to provide a lightweight elongated rope loop connection. A cover plate 31 may be added to the plates 40, 41 of FIG. 3 or FIG. 3A to provide a watertight restraint for elongated rope loop 2 assembly.

Figure 4:
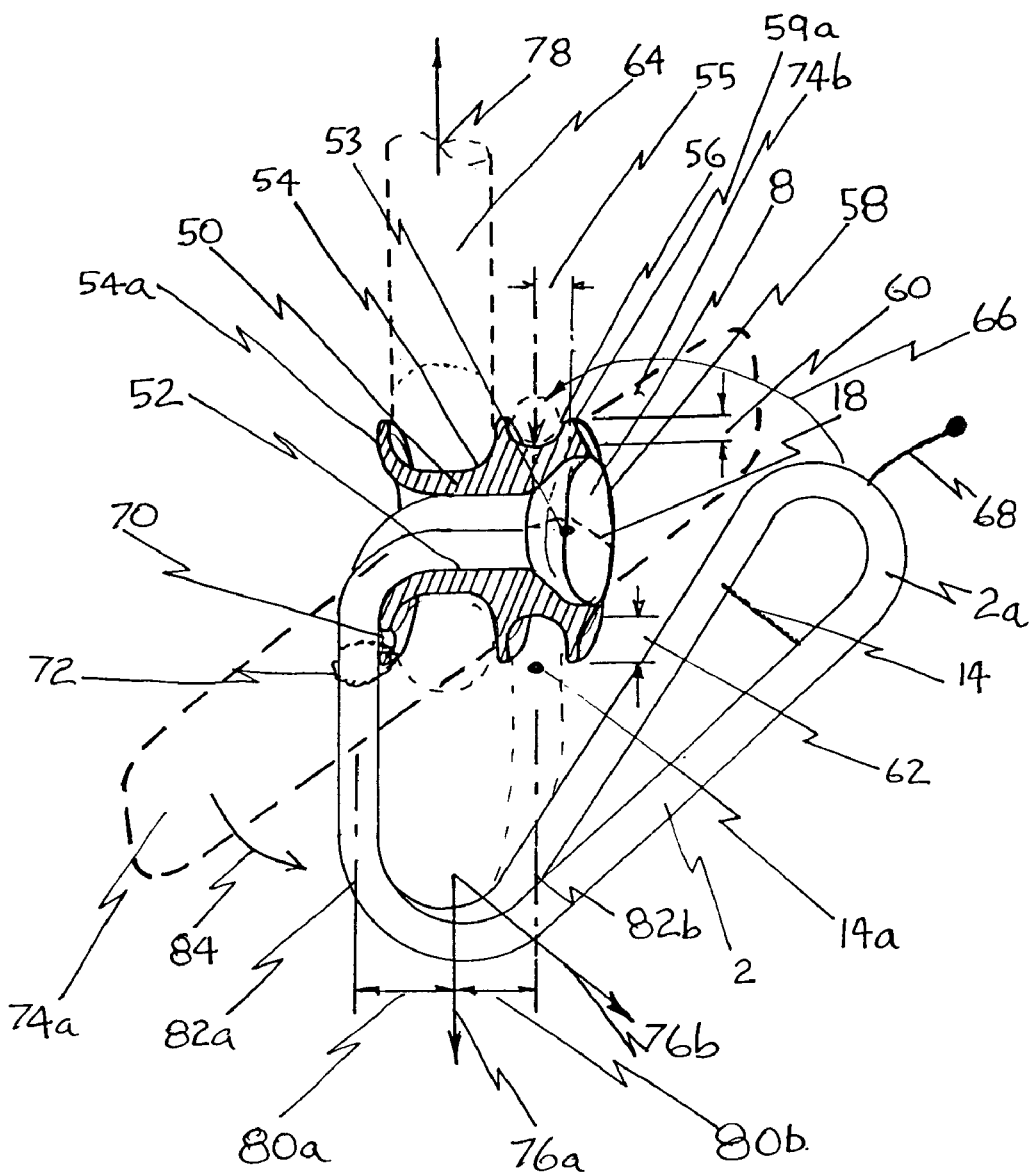
FIG. 4 shows an isometric view of a lightweight shackle formed from an elongate rope loop and a second body in half section.

FIG. 4 shows a connection assembly according to the present invention that includes a body 50 and an elongated rope loop 2. The body 52, shown in half section for clarity, has a central hole 52 formed therein and through which the elongate rope loop 2 passes. The central hole 52 has a counter-bore 58 for receiving the enlarged head 8. The diameter of the central, axial hole 52 is significantly smaller than the enlarged head 8 or multiple heads in order to restrain the enlarged head 8.

The body 50 has a first circumferential groove 54 formed around the body 50. Generally, a rope 64, shown dotted, is spliced, looped or otherwise contained in the groove 54 in the body 50.

A second circumferential groove 56 is formed in the body 50 adjacent to the first circumferential groove 54. The top part of the groove 56 has a first, top shoulder 59a with a height 60. The top part of the groove 56 accepts the free, top end 2a of the elongated rope loop 2. The bottom portion of the groove 56 has a second, shoulder 59b with a height 62 that is greater than the height 60 of the top portion of the groove 56. The differences in the heights of the shoulders 59a, 59b provides one way to capture the free, top end 2a of the elongated rope loop 2.

The connection assembly is lightweight, self locking, and is quickly attached and detached. The connection assembly uses the elongated rope loop 2 to connect a rope 64, shown dotted, and a second part. An arrow 78 indicates that a tensile load is applied between the rope 64. An arrow 76a indicates that a tensile load is applied by the second part.

The depth of the counter-bore 58 is such that a center 53 of the enlarged head 8 is positioned away from the groove 56 by a distance 55 so that forces on the body 50 between the free end 2a of the elongated rope loop 2a and the enlarged head 8 are compressive.

This arrangement allows for almost all of the connector assembly loads to be taken in tension by the elongated rope loop 2 with its enlarged head 8, with mostly compressive forces on the body 50.

FIG. 4 shows the free end 2a of the elongated rope loop 2 in a detached position. As indicated by an arrow 66, the free end 2a of the elongated rope loop 2 is attached to the body 50 by first engaging a tie 14 in bottom of groove 56 shown at 14a.placing the free end 2a of the elongated rope loop 2 on the top shoulder 59a. The free end 2a of the elongated rope loop is be placed on shoulder by The tie 14 and the two different shoulder heights 60 and 62 provide a self-locking mechanism that allows the free end 2a of the elongated rope loop 2 to be readily attached and detached using lanyard 68 attached to the top of the free end 2a. This self-locking mechanism will not allow the elongated rope loop 2 to become unintentionally detached by forces in, for example, a 76b when loads are not tensile loads.

Tensile loading is shown by the rows 78 and 76a. The first circumferential groove 54 and the second circumferential groove 56 are arranged so that distances 80a and 80b are approximately equal, so that when tensile loads are applied along 78 and 76a, approximately equal forces are taken by legs 82a and 82b of the elongated rope loop 2. The top of the free end 2a of the elongated rope loop 2 is locked in by the top shoulder 59a of the circumferential groove 56.

If the load is reduced and the direction of the forces at the free end 2a of the elongated rope loop 2 changes to a direction that is represented by the arrow 76b, as when fitting is used in a jib sheet which is flogging, the position of the tie 14 at the location 14a prevents the free end 2a of the elongated rope loop 2 from disengaging with the top shoulder 59a.

Using this self-locking mechanism, the free end 2a of the elongated rope loop 2 can only be removed from the groove 56 over the top shoulder 59a with a height 60 by pulling upwards and out on the lanyard 68, which causes the tie 14a to rise up into the lower portion of the second circumferential groove 56 so that free end 2a of the elongated rope loop 2 can be disengaged and connection assembly opened.

A hole 70 in flange a flange 54a of the body 50 is provided adjacent to the lower portion of the first circumferential groove 54 so that elongate legs 82a and 82b can be whipped with twine 72 to retain the enlarged head 8, the elongated rope loop 2, and the body 50 in a self-locking orientation as described above.

Alternatively, for the tie 14 are shown dotted at 74a and 74b two ends of an alternative VELCRO tie which are wrapped around the body 50 in a direction 84 to retain the free end 2a of the elongated rope loop 2 in position over the top shoulder 59a.

Figure 4A:
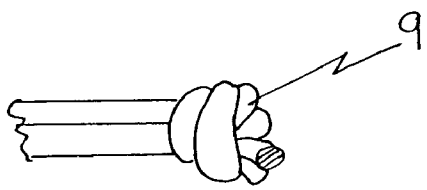
FIG. 4A shows a plan view of an alternative elongate rope loop end connection.

FIG. 4a shows a knotted end 9 of an elongated rope loop 2, can be substituted in place of potted joint provided by the enlarged head 8.

Figure 5:
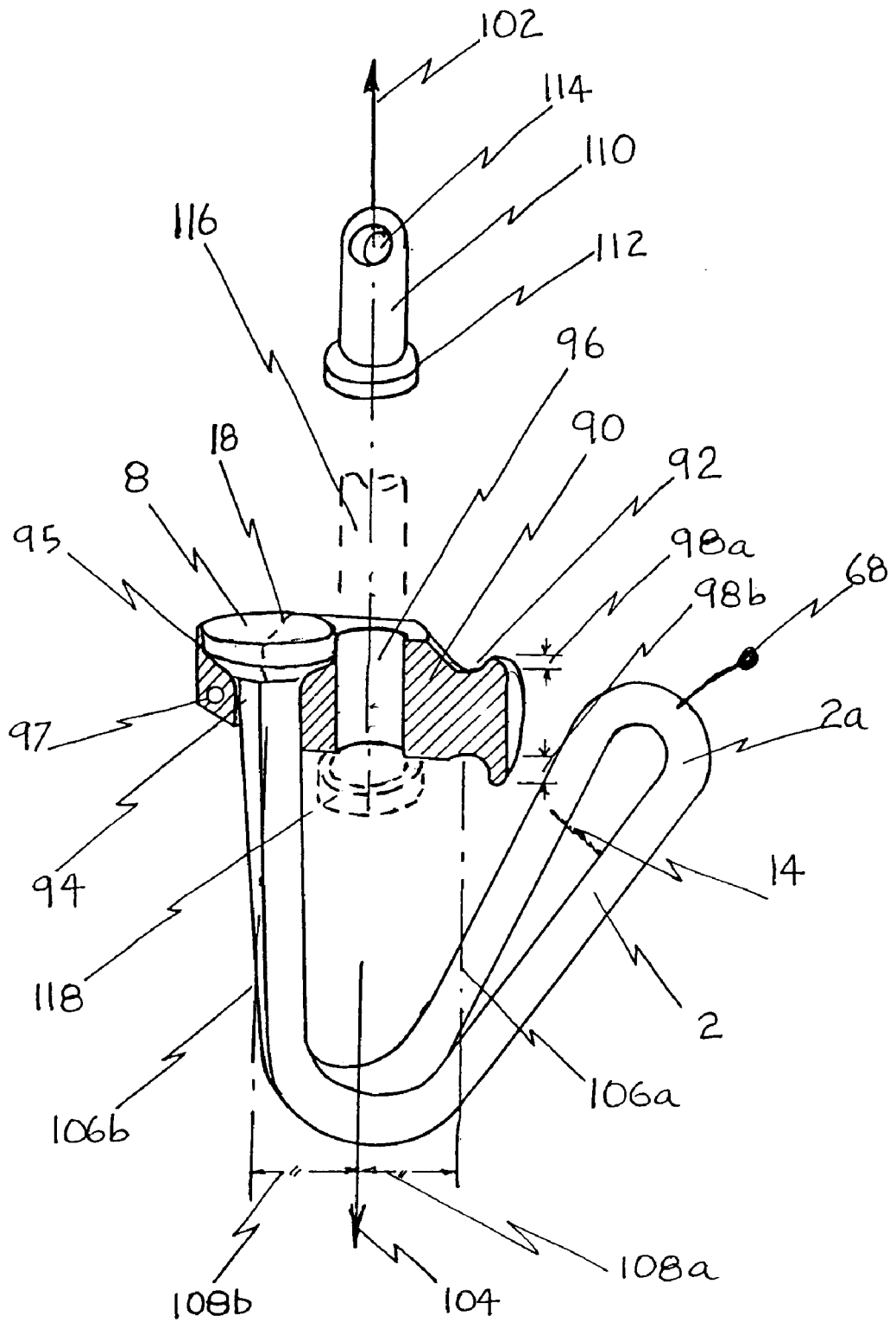
FIG. 5 shows an isometric view of a lightweight swivel shackle formed from an elongate rope loop and a second body in half section.

FIG. 5 shows an assembly of a quickly attached and detached, lightweight, locking, rope connector assembly according to the present invention. This assembly is similar in operation to illustrated in FIG. 4, except that it is designed to swivel. A body 90, as shown a half section for clarity, has a through-hole 94 counter-bored at 95 to accept an elongated rope loop 2 and an enlarged head 8 with the through hole 94 significantly smaller than a counter bore 95 to retain the enlarged head 8. Opposite the through-hole 94 is formed a shoulder groove 92. Another through-hole 96 is provided approximately centrally between through-hole 94 and the groove 92. The groove 92 has top shoulder with a height 98a smaller than a bottom height 98b. A hole 97 is provided so that whipping can be applied around the two legs of the elongated rope loop 22 legs and the hole 97 to retain the enlarged head 8 in the counter-bore 95.

When the top 2a of the elongated rope loop top 2 is positioned on shoulder 92, as described above, tensile loads can be applied in a direction 102 through the central hole 96 on one side and around elongate loop legs at a point 104 on the other side. Since the central hole 96 is approximately equally positioned between hole 94 and grooved shoulder 92, loads are taken equally by elongate loop legs at 106a and 106b. Distances 108a and 108b are also equal and the assembly is in equilibrium, as illustrated, when the top 2a of the elongated rope loop top is locked into the top shoulder groove 92 and the connector is loaded in tension, as described.

Alternatively, a load in a direction 102 can be applied to the body 90 through hole 96 by a rope 116, as shown by dotted lines. Rope 116 has an enlarged knotted, potted or otherwise termination head 118 to act as a stop, enabling the rope 116 loaded in the direction 102 to swivel in relation to the connector body 90 and a bottom load 104.

A pin 110 with an enlarged head 112 has an attachment hole 114. Pin 110 is designed to have a clearance fit in hole 96 in lieu of rope 116 and enables the body 90 to swivel in relation to pin 114 when fitted and when connector is loaded. Pin 110 fits in the hole 96 such that its head 112 is in position of dotted head 118. This enables a rope to be applied through hole 114 and be loaded in direction 102.

It should be noted that the enlarged head 8 in this embodiment and other embodiments may be made in two separate halves as shown by dotted line 18.

Figure 6:
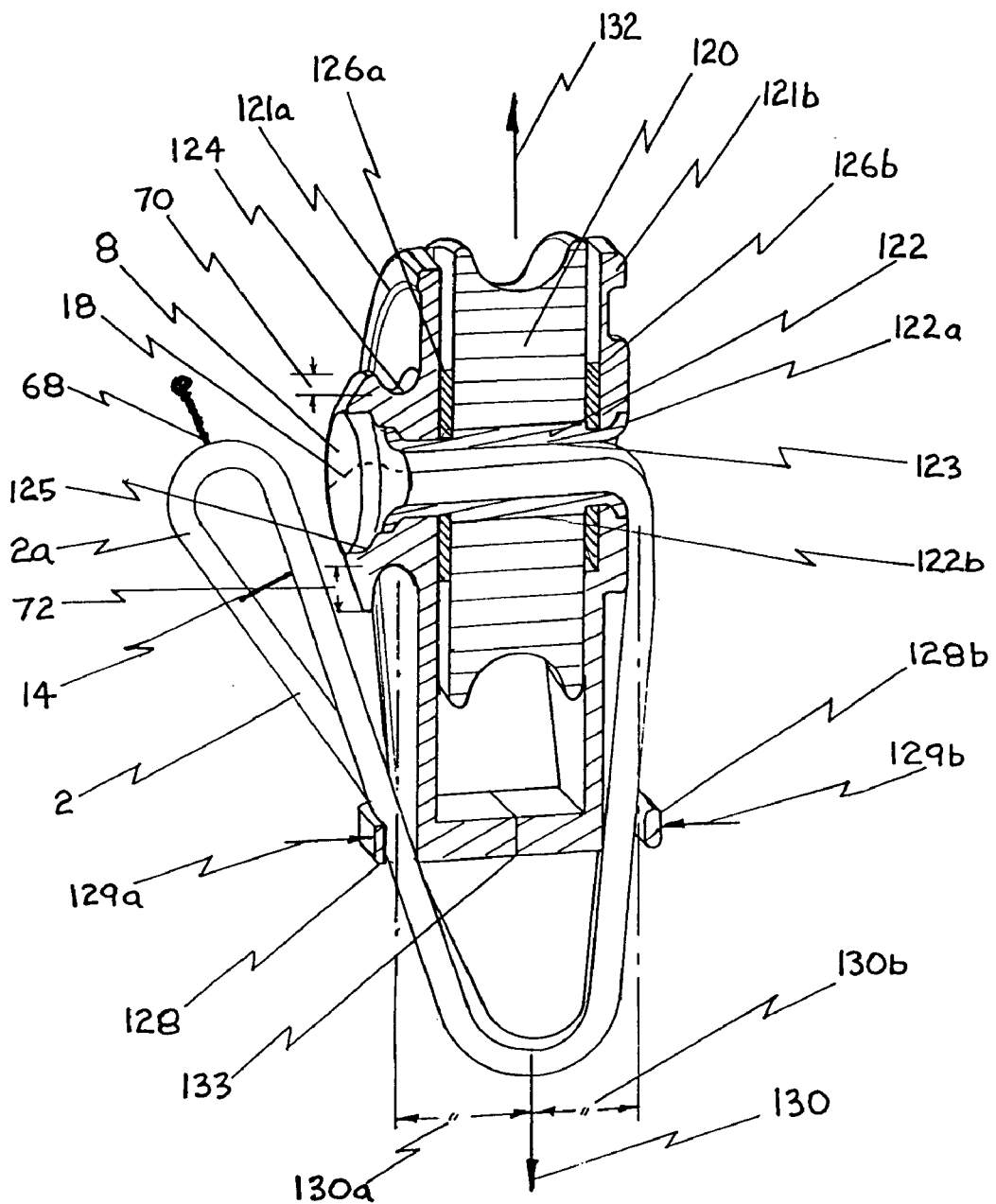
FIG. 6 shows an isometric, sectional view of an elongate rope loop, forming a connector applied to a sheave rotating around a body to form a block.

FIG. 6 illustrates how the connector concept of FIG. 4 can be modified by the addition of a sheave 120 to provide a block assembly, shown in half section for clarity. Body halves 121a and 121b together with a shaft 122 form an assembly in which an elongated rope loop 2 and its enlarged head 8 are retained. A hole 123 accepts the legs of the elongated rope loop 2 while a counter bore 125 accepts an enlarged head 8 to form a elongate rope loop connector identical in operation to that of the elongate rope loop connector of FIG. 4.

Body halves 121a and 121b are connected via a hollow shaft 122, which is riveted on each end as in 122a. Shaft 122 has enlarged diameter at 122b which together with side washers 126a and 126b hold captive sheave 120 which is free to rotate around shaft 122. Since most of the load is taken in tension, as shown by arrows 130 and 132, by the elongated rope loop 2, the enlarged head 8 and shaft 122, side pieces 121a and 121b can be made of plastic. The only metal in the assembly is shaft 122 and washers 121, hence the assembly becomes a lightweight block, with self-locking rope loop quick connect or disconnect action. As in the previous connector of FIG. 4, this assembly is designed such that the distances 130a and 130b of the legs of the elongated rope loop 2 leg are approximately equal, so that when loads are applied at 132 and 130, they are equally taken by the elongated rope loop 2 so that the sides and block are in equilibrium.

As in body 50 of FIG. 4, a counter-bore 125 positions the center of the enlarged head 8 sufficiently to the left of groove 124 so that, when loaded, forces in side 121a between the top of the elongated rope 2 and the enlarged head 8 are compressive.

The legs of the elongated rope loop 2 pass through slots 128a and 128b in extended sides 121a and 121b. The slots retain the legs of the elongated rope loop 2 legs in position on lower extensions of sides 121a and 121b. When tensile load is applied to the block via the elongated rope loop 2, shown by arrows 130 and 132, the compression forces of the legs of the loop 2, shown by arrows 129a and 129b, are taken by member 133 so that sheave is not pinched under these side loads 129a and 129b and can operate smoothly even under full load.

As in FIG. 4, the top 2a of the elongated rope loop sits in a shoulder groove 124 which together with unequal groove depths at top 70, bottom 72, and tie 14 form an easily removed and replaced, but self locking, lightweight arrangement for attaching a block.

It should be noted that knot 9 of FIG. 4A can replace the potted joint of the enlarged head 8, which is substantially larger than the shaft 122 hole 123 so as to restrain head under load. It should also be noted that the enlarged head 8 of FIG. 1, can be formed in two pieces shown as dotted joint 18. It should be further noted that multiple sheaves may also be used in place of single sheave 120. It should also be noted that side slots 128a and 128b may be formed by separate pieces to sides 121a and 21b.

Figure 6A:
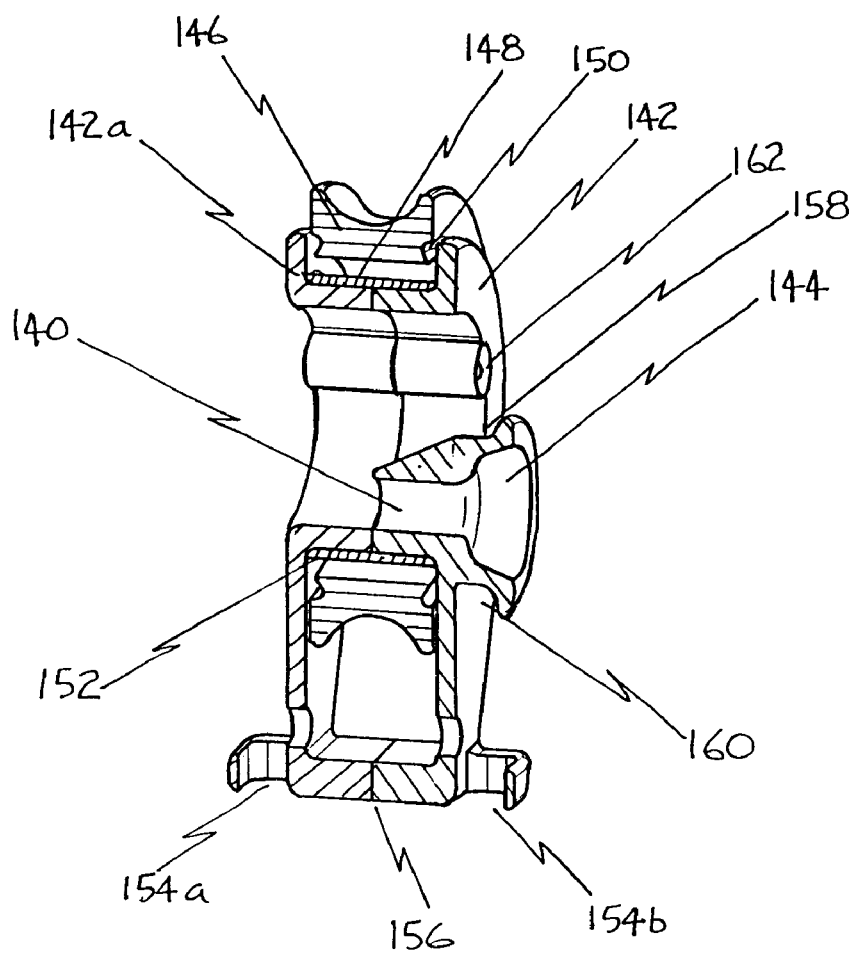
FIG. 6A shows an isometric view of a rope connectable air block assembly, which is shown in half section.

FIG. 6A shows an embodiment of a construction of the concept according to the present invention shown in FIGS. 5 and 6, that is applied to an air-block with a hollow center. An air-block assembly of FIG. 6A is identical in concept and operation to the rope loop connection system of block of FIG. 6 and hence is shown without the elongated rope loop 2 and the enlarged head 8 of FIG. 4. It should be noted that in the block of FIG. 6A and in all the enclosed examples, it is preferred that the elongated rope loops be easily removable and fitted by maintaining a clearance fit between the legs of the elongated rope loops and the top end, or heads, of the elongated rope loops and their respective bores, so that if an elongate rope loop wears it can be replaced.

The assembly of FIG. 6A is shown in half section for clarity with body halves 142a and 142b respectively shown being able to be bolted together through screw holes, one of which is depicted at 162. A block is shown with inner race 152 for roller bearings, which are not shown but fit in spaces 148 and 150.

A single sheave 146 is shown, but as in block of FIG. 6 multiple sheaves could be used in place of single sheave 146. A hole 146 for the legs of an elongated rope loop 2 legs is shown at 140 and counter-bored recess for head at 144. Diameter 144 is significantly larger than hole 140 to retain head 8, when fitted, under load. Top shoulder groove portion 158 and bottom groove portion 160 vertical center are shown positioned to the left of the position of center of head recess 144. The shoulder groove 158 top portion height being smaller than bottom portion height of groove 160 so as to provide self locking means as described in the connector of FIG. 4 if used in conjunction with a correctly positioned tie 14 of the elongated rope loop 2, both of which are illustrated in FIG. 4. Also shown are side openings 154a and 154b for location of the legs of the elongated rope loop 2 and a compression bar 156 to prevent loaded side pressure impinging on sheave 146.

Figure 7:
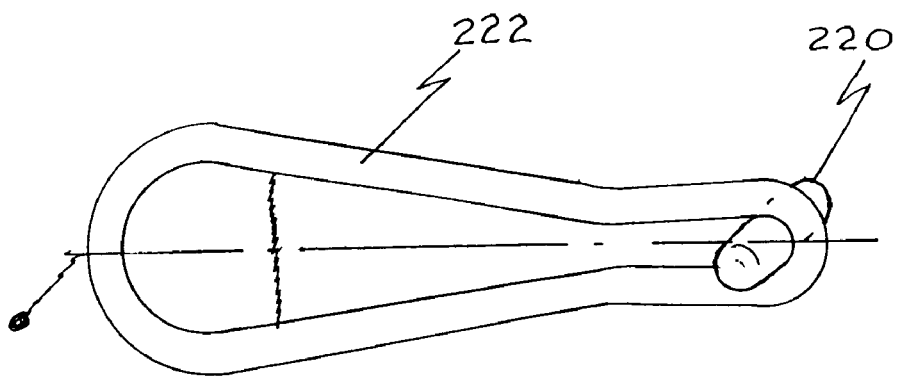
FIG. 7 shows an isometric view of a continuous elongate rope loop, tension connection device with a pin as the terminating means.

FIG. 7 shows a continuous elongated rope loop 222 with a pin 220. This continuous elongated rope loop 222 can be used to replace the elongated rope loops 2 in the bodies of FIGS. 3, 4, 5, 6, and 6A. The pin 220 acts as a restraining means on loop 222 in place of the enlarged head 8 of FIG. 1.

Figure 8:
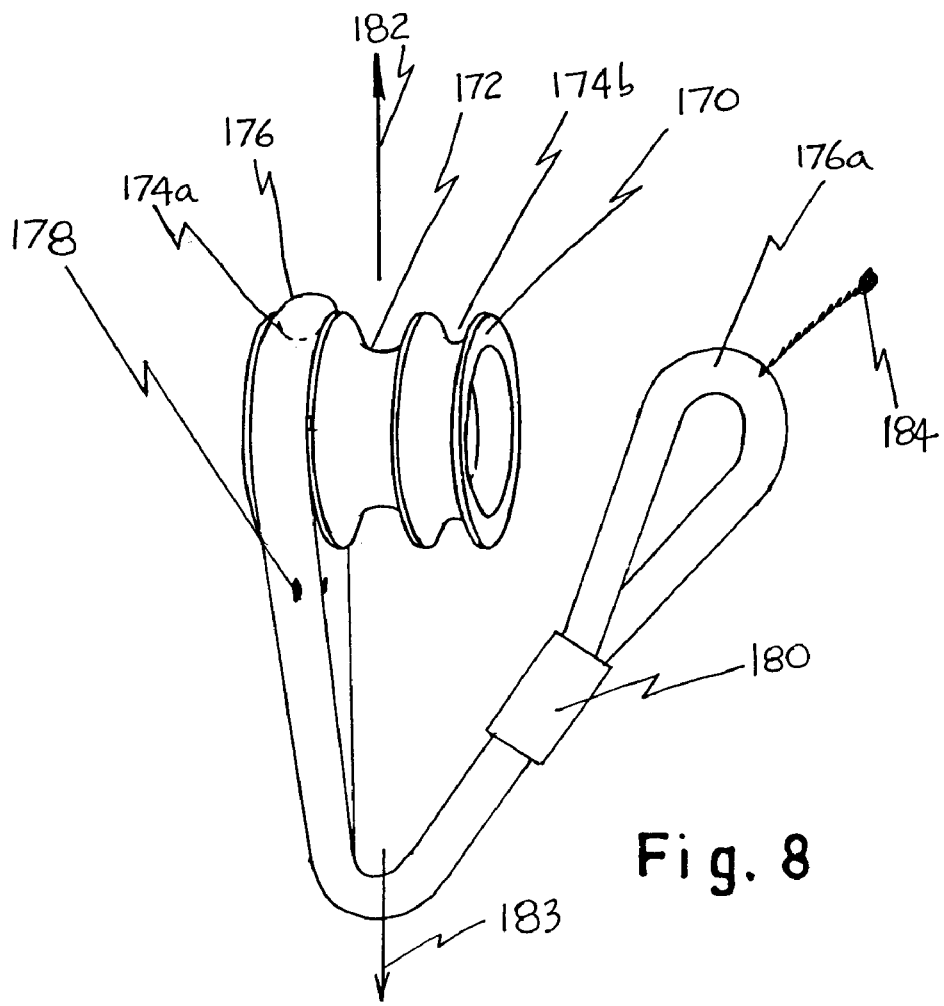
FIG. 8 shows an isometric view of an alternative connector to that of FIG. 4, using the continuous elongate loop of FIG. 7.

FIG. 8 shows an isometric view for an alternative construction of elongated rope loop connector of FIG. 4 in which a bobbin 170 has three grooves, including a center groove 172 and outer grooves 174a and 174b, respectively, spaced equally about the center groove 172. A continuous fiber elongated rope loop 176, with or without a joint, is permanently affixed to the groove 174a via a sewn tie 178, or other means. The other free end 176a of the elongated rope loop 176 has an elastic, or otherwise, sleeve 180 positioned so that the end of the elongated rope loop end 176a can be slipped over shoulder groove 174b but will not disengage unless a lanyard 184 is pulled. This arrangement forms an easily fitted or removed lightweight elongated rope loop tension connector when a load shown by arrow 182 is applied through the elongated rope loop at 183 and around groove 172.

Figure 9:
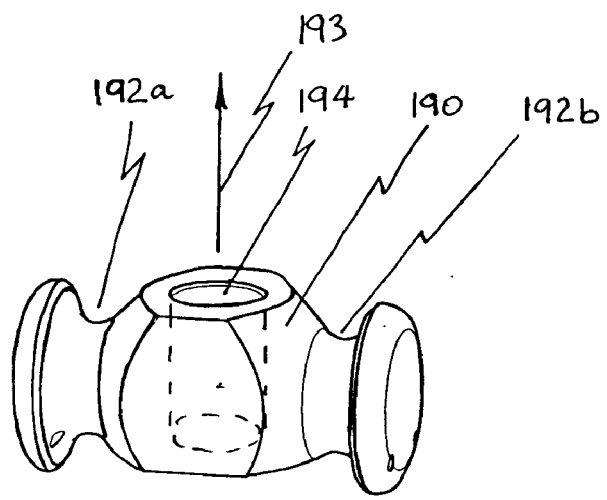
FIG. 9 shows an isometric view of an alternative swivel connector body to that of FIG. 5.

FIG. 9 shows an isometric view of an elongated rope loop shackle body 190 having shoulder grooves 192a and 192b that are respectively spaced equally about a central through hole 194. This body 190 is an alternative to the body 170 of FIG. 8, and is designed to receive elongated rope loop assembly 176 of FIG. 8 where the elongate rope loop 176 operates in exactly the same manner with body 190 as with body 170 of FIG. 8. One side of the load shown by arrow 193 is applied through central hole 194, as in load 102 of FIG. 5, in order that the loaded body 190 is free to swivel about 194 when loaded in tension in direction 193.

Figure 10:
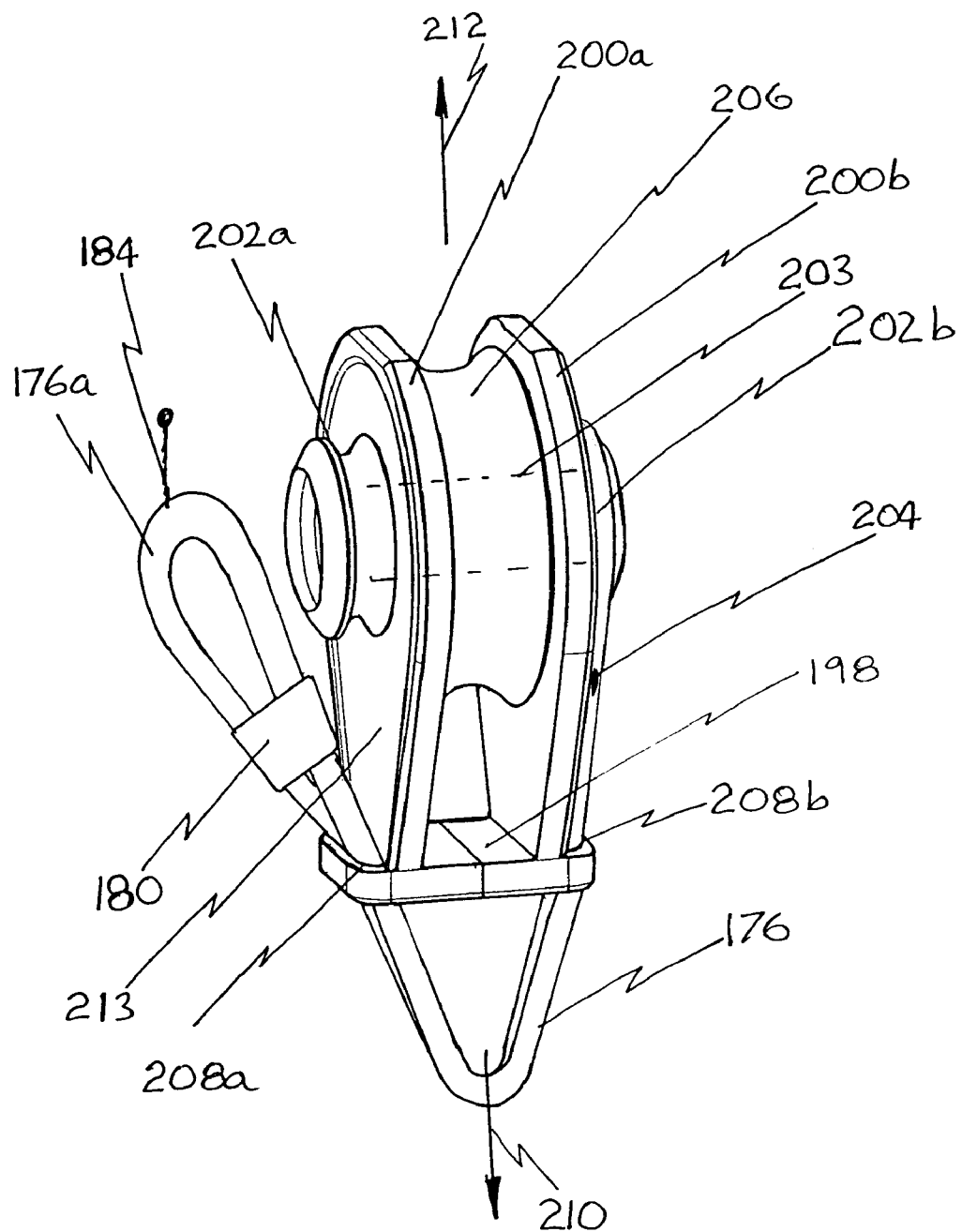
FIG. 10 shows an isometric view of an alternative block and elongate rope loop connection system to that of FIGS. 6 and 6A.

FIG. 10 shows an isometric view of a block according to the present invention where the elongated rope loop 2 of FIG. 1 has been substituted by the continuous elongate rope loop 176 of FIG. 7, without a pin 220. The block of FIG. 10 has identical side plates 200a and 200b, each having a shoulder groove 202a and 202b respectively upon which the end of an elongated rope loop 176 sits. The elongated rope loop 176 is fixed to shoulder groove 202b via a sewn tie 204. As in the elongated rope loop 2 of FIG. 6, the free end of the elongated rope loop 176a passes through slots 208a and 208b. Operation of the free end of the elongated rope loop 176a is identical to that of FIG. 8 with regard to engaging and disengaging shoulder and groove 202a, to form a quickly engaged and disengaged lightweight block with tensile loads taken by the elongated rope e loop at 210 and sheave 206 in direction 212. Shaft 203 through the center of the sheave 206 passes under grooves 202a and 202b so that tensile loads from elongate loop tops engaging grooves 202a and 202b transfer forces to sheave 206 by mostly compressing top of grooves 202a and 202b. As in FIGS. 6 and 6A, a compression member 198 is provided against side loads from loop 176 legs when loaded. It should be noted that an opening could be made in side 200a at 213 and also in the sides of the blocks of FIGS. 6 and 6a to enable the blocks to act as snatch blocks.

The elongated rope loop connection means shown in the above examples are not limited only to those examples. Each of the elongate loop retention security means shown above could be used in many of the other examples. It should be noted that although the primary connection and termination of ropes in the foregoing is by potting, it should be understood that alternative methods of terminating and joining such as swaging, crimping or fusing can be employed. It should also be noted that although the elongated rope loops with a single turn are employed in the above, multiple turns are also possible. It should also be noted that the concept disclosed is not meant to be complete or define a particular model or limit the concept or application in any way.

From the foregoing, it should be readily evident, that there has been provided a significantly improved simple lightweight method of making the various connections of halyards sheets ropes to sails, blocks and other attachment points on yachts using a high strength elongated rope loop.

What is claimed is:

1. A tensile connector for connecting a first rope to an object, comprising:
   a body that is formed to allow the first rope to be attached thereto, said body having a shoulder, said body also being formed to hold captive one end of an elongate rope loop that has one loop end held captive in said body and that has a free loop end; and wherein said free loop end of said elongate rope loop is adapted to being connected through the object and back over said shoulder of said body to thereby form a quickly attached and detached tensile connector for connecting said first rope and said object.

2. The tensile connector of claim 1 including a restraint for holding the elongate rope loop in engagement with said shoulder of said body and for preventing disengagement of said elongate rope loop from said shoulder of said body.

3. The tensile connector of claim 1 wherein the body has a swivel attachment hole formed therethrough for swivel attachment of a first item to the body to thereby enable said body to rotate with respect to the first item while the elongate rope loop is connected to the body.

4. A tensile connector to connect a first rope to an object comprising:

a body that is formed to allow the first rope to be attached thereto, said body having a shoulder, said body also being formed to hold captive with a cross pin one loop end of a second elongate rope loop that also has a free loop end; and wherein said free loop end of said elongate rope loop is adapted to being connected through the object and back over said shoulder of said body to thereby form a quickly attached and detached tensile connector for connecting said first rope and said object.

5. The tensile connector of claim 4 wherein the body has a swivel attachment hole formed therethrough for swivel attachment of a first item to the body to thereby enable said body to rotate with respect to the first item while the elongate rope loop is connected to the body.

6. A connection system for connecting first and second objects under tensile load, comprising:

a body having a centrally placed hole, having first and second external shoulders located around said centrally place hole;

said first shoulder adapted to receive a first elongate rope loop connected to the first object;

a free second end of the said first elongate rope loop connected to said first object and over said second shoulder to form a connection between said body and said first object;

a second elongate rope loop that passes through said centrally placed hole having one end thereof retained in said central hole;

said second elongate rope loop connected to said second body; and said second body able to rotate about said second rope loop to form a rotating connection device between said first and second objects.

7. A rope loop connection system and block assembly for securing a block to a second item, comprising:

a block assembly having at least one sheave that is adapted to having a sheave load rope connected thereto;

an elongate rope loop having a first end that is restrained by said block assembly;

a second free end of said elongate rope loop that is connected to said second item and over a shoulder of said block assembly to provide a quickly attached and detached load connection block.

8. In a lightweight tensile loadable, removable, connection system, connecting two load items A and B under load, comprising:

a connection body;

means for connecting load item A to said connection body;

at least one shoulder integral with said connection body and located adjacent to said load item A connection means;

an elongate rope loop with terminating means at one end that is restrained by said connection body; and a free end of said elongate rope loop capable of fitting through said second load item B and over said shoulder to provide a removable, tensile, load connection between load items A and B.

9. The system of claim 8 in which the means for connecting load item A to said connection body is provided through a central hole in said connection body such that said connection body and said load item B rotate in relation to said load item A.

10. A block assembly for connecting to a second body comprising:

at least one sheave rotatably mounted between two side plates of a block;

a shoulder on each side plate;

a rope loop passing over each of said shoulders to provide a loop connection to said second body.

* * * * *